United States Patent Office

3,287,368
Patented Nov. 22, 1966

3,287,368
DIHYDROBENZOTHIEPIN-5(2H)-ONE OXIMES
Richard J. Mohrbacher, Fort Washington, Pa., assignor to McNeil Laboratories, Incorporated, a corporation of Pennsylvania
No Drawing. Filed June 8, 1965, Ser. No. 462,412
8 Claims. (Cl. 260—327)

This invention relates to novel dihydrobenzothiepin-5(2H)-one oximes. More particularly, it concerns dehydrobenzothiepin-5(2H)-one oximes having the formula

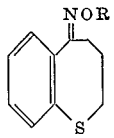

wherein R is a member selected from the group consisting of hydrogen, loweralkyl-carbonyl, phenyl carbonyl, benzene sulfonyl and substituted benzene sulfonyl.

As used herein, loweralkyl may be straight or branch chained and have from 1 to 6 carbon atoms, such as, for example, methyl, ethyl, propyl, isopropyl, butyl, isobutyl, tertiary butyl and the like.

The compounds of this invention have valuable pharmacological properties in view of their CNS depressant activity.

The compounds 3,4-dihydro-1-benzothiepin-5(2H)-one oxime, is prepared by reaction of 3,4-dihydro-1-benzothiepin-5(2H)-one with hydroxylamine in a suitable solvent, and preferably using hydroxylamine hydrochloride in the presence of an alkali such as potassium hydroxide in ethanol or isopropanol under reflux conditions, followed by acidification of the reaction mixture to obtain the product.

The O-acyl derivative of the oxime is prepared by reacting the above oxime with an acid anhydride such as acetic anhydride, or an acid chloride, such as butyryl chloride, in a solvent such as pyridine.

The O-benzene sulfonyl, O-p-toluene sulfonyl and O-p-bromobenzene sulfonyl derivatives are prepared by reacting the oxime wtih benzene sulfonyl chloride, p-toluene sulfonyl chloride and p-bromobenzenesulfonyl chloride respectively in the presence of a base such as pyridine.

The following examples are intended to illustrate, but not to limit, the scope of the present invention.

*Example I*

A solution of 11.2 g. (0.16 mole) of hydroxylamine hydrochloride in 16 ml. of water is added to a stirred slurry of 17.8 g. (0.1 mole) of 3,4-dihydro-1-benzothiepin-5(2H)-one in 60 ml. of 95% ethanol. Aqueous potassium hydroxide (15.7 g., 0.28 mole of potassium hydroxide in 15.7 ml. of water) is then added and the slurry is heated under reflux for 2 hours, cooled, poured into ice water and acidified wth concentrated hydrochloric acid. White crystals form. The crystals are recovered by filtration. Three recrystallizations from 95% ethanol yield white crystals of 3,4-dihydro-1-benzothiepin-5(2H)-one oxime; M.P. 97–99° C.

*Example II*

A 9.7 g. (0.05 mole) quantity of 3,4-dihydro-1-benzothiepin-5(2H)-one oxime is dissolved in 50 ml. of pyridine in an amber flask. The solution is cooled in the dark. Cold acetic anhydride (50 ml., about 0.53 mole) is added and the solution is refrigerated for 3 hours. The flask is taken to a dark hood where the addition of ice yields white crystals. One recrystallization from benzene-hexane produces white crystalline O-acetyl-3,4-dihydro-1-benzothiepin-5(2H)-one oxime; M.P. 111–112.5° C.

*Example III*

A solution of 78.5 g. (0.413 mole) of freshly recrystallized p-toluenesulfonyl chloride in 120 ml. of pyridine is added in a period of 5 minutes to a stirred solution of 78 g. (0.4 mole) of 3,4-dihydro-1-benzothiepin-5(2H)-one oxime previously cooled in an ice-salt bath. After the 5 minute addition, the mixture is stirred for 15 minutes in an ice-salt bath and then placed in a freezer for 18 hours. The iced solution is poured into ice water and the gum that forms is extracted into ether. The aqueous layer is extracted several times with ether and benzene. All the organic solutions are combined and dried in a refrigerator. The solution is concentrated in vacuo below 20° C. to give an orange-red oil; O-p-tosyl-3,4-dihydro-1-benzothiepin-5(2H)-one oxime.

*Example IV*

Using the procedure of Example II and replacing acetic anhydride with an equivalent amount of butyryl chloride, the resulting product is O-butyryl-3,4-dihydro-1-benzothiepin-5(2H)-one oxime.

*Example V*

Using the procedure of Example III and replacing p-toluenesulfonyl chloride with equivalent amounts of benzenesulfonyl chloride and p-bromobenzenesulfonyl chloride the resulting products are O-benzenesulfonyl-3,4-dihydro-1-benzothiepin-5(2H)-one oxime and O-p-bromobenzenesulfonyl - 3,4 - dihydro - 1 - benzothiepin-5(2H)-one oxime.

*Example VI*

Using the procedure of Example III and replacing p-toluenesulfonyl chloride with an equivalent amount of benzoyl chloride, the resulting product is O-benzoyl-3,4-dihydro-1-benzothiepin-5(2H)-one oxime.

What is claimed is:
1. A member selected from the group consisting of dihydrobenzothiepin-5(2H)-one oximes having the formula

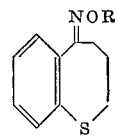

wherein R is a member selected from the group consisting of hydrogen, loweralkyl-carbonyl, phenyl carbonyl, benzene sulfonyl, p-toluenesulfonyl and p-bromobenzenesulfonyl.

2. 3,4-dihydro-1-benzothiepin-5(2H)-one oxime.
3. O-acetyl 3,4-dihydro-1-benzothiepin - 5(2H) - one oxime.
4. O-p-toluenesulfonyl-3,4 - dihydro - 1 - benzothiepin-5-(2H)-one oxime.
5. O - butyryl - 3,4 - dihydro - 1 - benzothiepin-5(2H)-one oxime.
6. O - benzenesulfonyl - 3,4 - dihydro - 1 - benzothiepin-5(2H)-one oxime.
7. O - p - bromobenzenesulfonyl - 3,4 - dihydro - 1-benzothiepin-5(2H)-one oxime.
8. O - benzoyl - 3,4 - dihydro - 1 - benzothiepin-5(2H)-one oxime.

No references cited.

WALTER A. MODANCE, *Primary Examiner.*

JAMES A. PATTEN, *Assistant Examiner.*